A. E. KEITH.
AUTOMATIC TELEPHONE SYSTEM.
APPLICATION FILED JULY 6, 1908.

1,237,208.

Patented Aug. 14, 1917.
7 SHEETS—SHEET 1.

Witnesses
A. Andersen.
H. M. Merriam

Inventor:
Alexander E. Keith,
By Bulkley, Durand & Drury,
Attorneys

A. E. KEITH.
AUTOMATIC TELEPHONE SYSTEM.
APPLICATION FILED JULY 6, 1908.
1,237,208.
Patented Aug. 14, 1917.
7 SHEETS—SHEET 3.
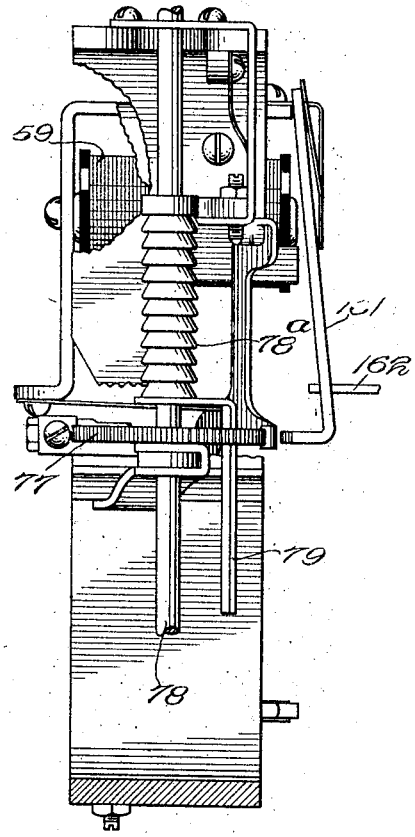
Fig. 3.
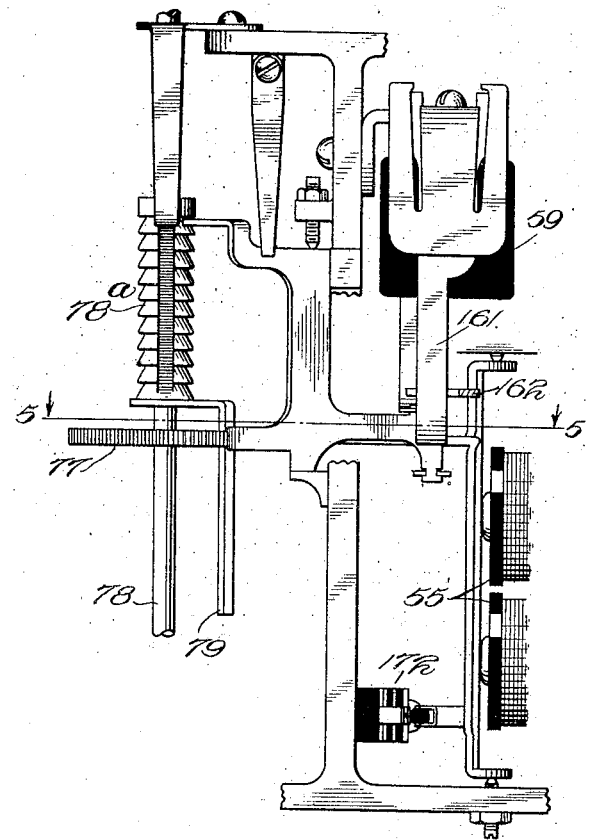
Fig. 4.
Fig. 5.
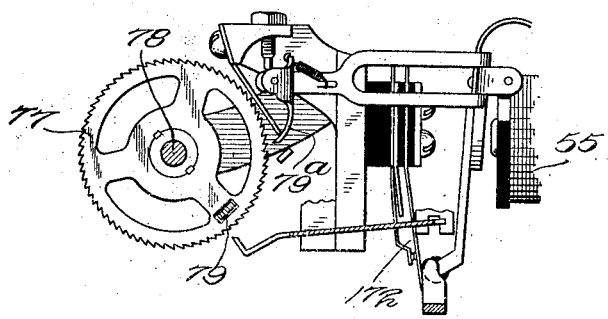
Witnesses
A. Andersen.
H. M. Merriam
Inventor:
Alexander E. Keith,
By Bulkley, Durand & Drury,
Attorneys.

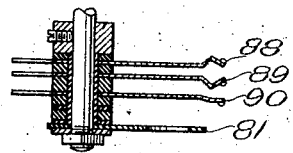
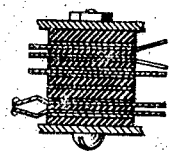
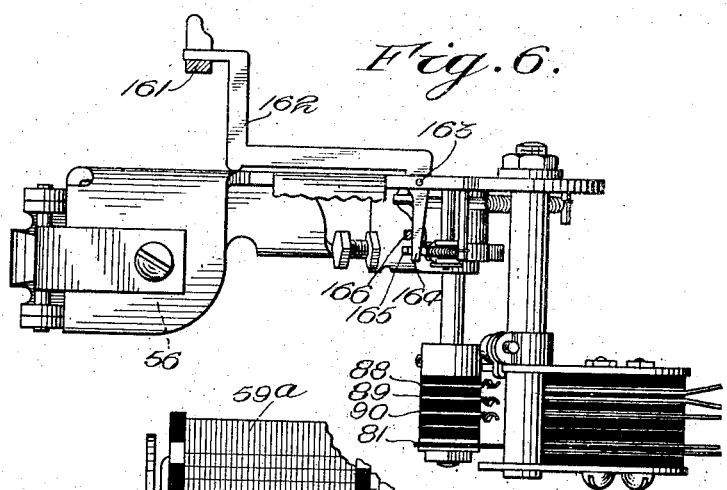
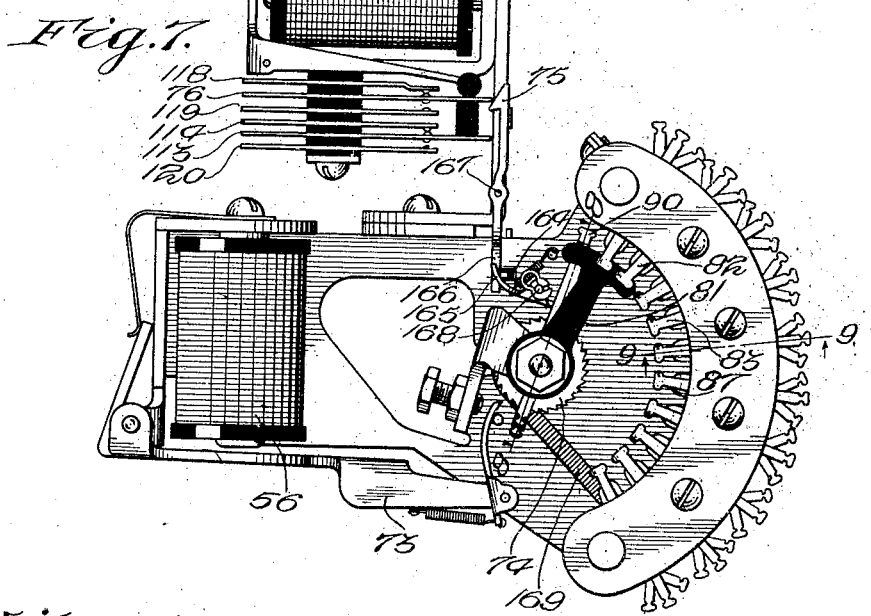

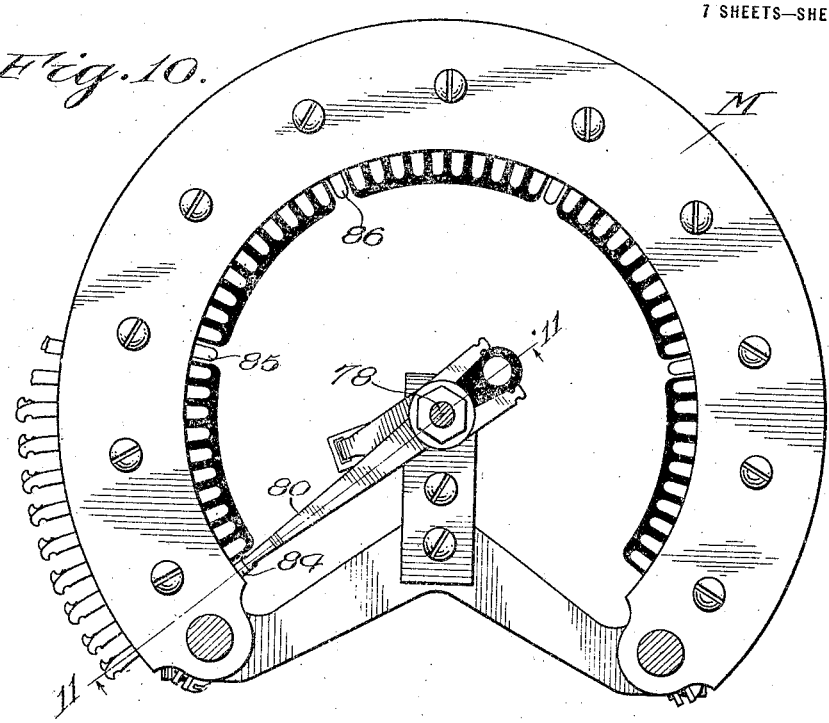
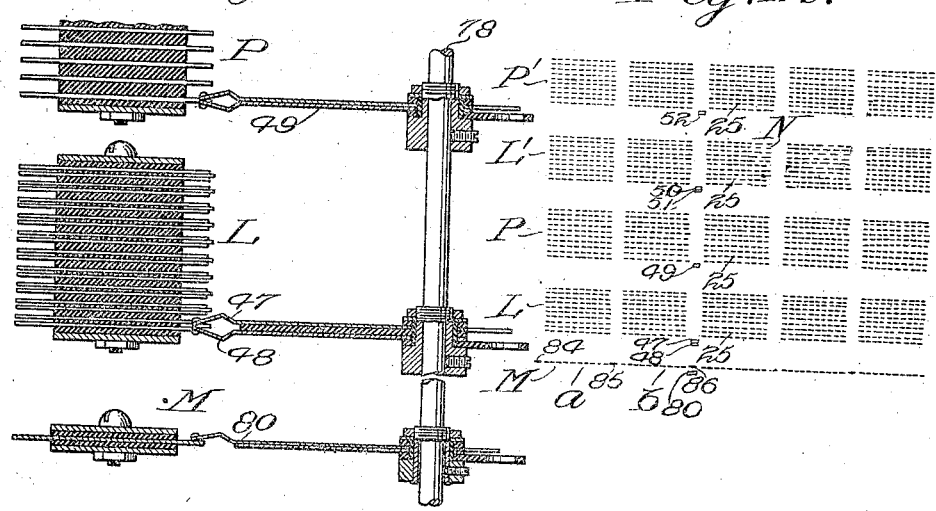

Inventor
Alexander E. Keith
By E. D. Fales.
Attorney

UNITED STATES PATENT OFFICE.

ALEXANDER E. KEITH, OF HINSDALE, ILLINOIS, ASSIGNOR TO AUTOMATIC ELECTRIC COMPANY, OF CHICAGO, ILLINOIS, A CORPORATION OF ILLINOIS.

AUTOMATIC TELEPHONE SYSTEM.

1,237,208.

Specification of Letters Patent.

Patented Aug. 14, 1917.

Application filed July 6, 1908. Serial No. 442,124.

*To all whom it may concern:*

Be it known that I, ALEXANDER E. KEITH, a citizen of the United States of America, and resident of Hinsdale, Dupage county, Illinois, have invented a certain new and useful Improvement in Automatic Telephone Systems, of which the following is a specification.

My invention relates to automatic or semi-automatic telephone exchange systems of that character in which the automatic switches have vertical motion to select groups or divisions of the exchange, and rotary motion to connect with a line in the selected group or division, the vertical motion of the switch being always under the direct control of the calling subscriber, or an operator, but the rotary motion being automatic if the switch is for the purpose of selecting idle trunks, or under the control of the calling subscriber if such rotary motion is for the purpose of making the final connection directly with the line of the called subscriber, the vertical motion, however, being in either case for the purpose of selecting a group of lines, either trunk-lines or subscribers' lines, depending upon whether the switch is a selector or a connector, and the rotary motion in either case being for the purpose of connecting with a line in the selected group, although for the broader purposes of my invention, as will hereinafter more fully appear, all of the switches in the exchange need not be characterized by both the vertical and rotary motion, as my invention contemplates, in one respect at least, a novel form of connector switch for use in conjunction with other switches of any suitable, known or approved character.

The principal object of my invention is, therefore, the provision of a connector switch having a capacity of at least one-thousand subscribers' lines, and in which the wipers, although having both vertical and rotary motion, are so arranged that each line wiper takes care of more than one hundred lines, preferably five hundred lines, thus obviating the necessity of providing a separate wiper for each one hundred lines, notwithstanding the fact that said wipers have both vertical and rotary motion whenever they are used to extend connection to a called subscriber's line.

I also provide, as will hereinafter more fully appear, a trunking arrangement whereby each subscriber does not have access to all of the groups of connectors and, therefore, does not have access to all of the different connectors of the exchange, but simply to as many groups of connectors as there are thousands, and with ten per cent. trunking this means that each subscriber has access to as many connectors as there are hundreds of subscribers to the exchange—that is to say, if there are ten thousand subscribers to the exchange, then each subscriber will have access to ten groups and hence to one hundred connectors, there being one thousand connectors in all, whereby the maximum number of subscribers calling at any one time are given proper trunking and connecting facilities.

It is also an object to provide certain novel details and combinations tending to increase the general efficiency and serviceability of an automatic one thousand line connector switch and system therefor of this particular character.

To the foregoing and other useful ends, my invention consists in matters hereinafter set forth and claimed.

In the accompanying drawings Figure 1 is a diagram of an automatic telephone system equipped with my improved connector switch A. At C there is represented a first-selector switch the line of which leads to substation D.

Figs. 3, 4 and 5 show details of the operative mechanism of the connector switch shaft.

Figs. 6 and 7 are, respectively, a side elevation and plan view of the wiper and hundreds-selecting mechanism of the connector switch.

Fig. 8 is a cross-section of the wipers on line 8—8 in Fig. 7.

Fig. 9 is a cross-section of the bank on line 9—9 in Fig. 7.

Fig. 10 is a plan view of the arrangement of the contacts in the connector bank.

Fig. 11 is a cross-section of the bank and shaft wipers taken on line 11—11 in Fig. 10.

Fig. 12 shows diagrammatically the grouping of the different sets of contacts in the bank.

Figure 1:
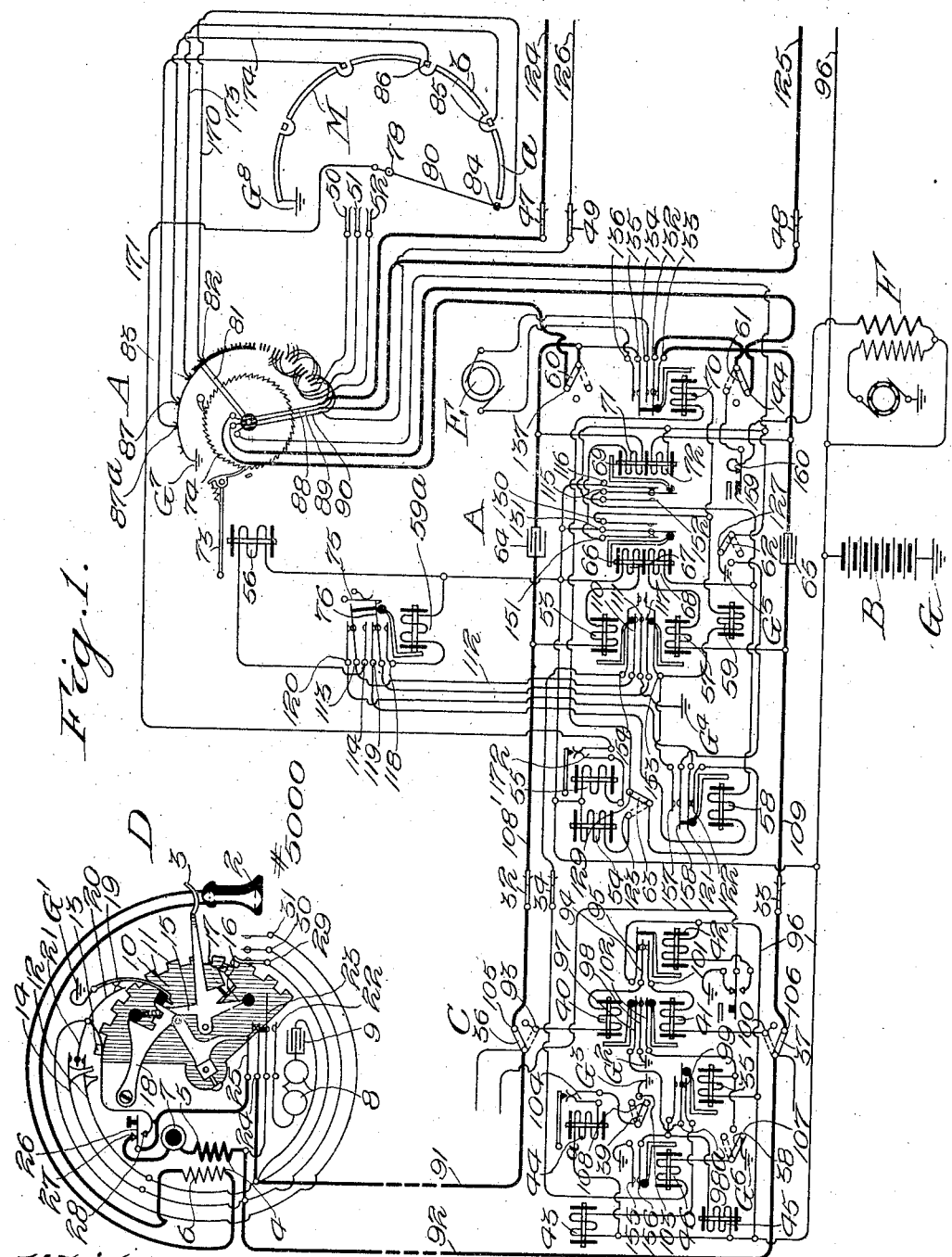

In Fig. 1 a central battery B, for both talking and operating purposes, is shown having its positive terminal preferably grounded at G. At E is shown a ringer generator, and at F is represented a busy-signaling machine.

The substations D and D¹ are of the general type disclosed in United States Letters Patent No. 866,639, granted September 24, 1907, to E. D. Fales, and are adapted for common battery work. Substation D comprises a receiver 2, switch-hook 3, induction coil 4 which consists of the primary winding 5 and secondary winding 6, transmitter 7, ringer 8 and condenser 9. In addition to the above-mentioned parts there is provided an impulse wheel 10 which has the usual vertical impulse teeth 11 that are adapted to operate the vertical impulse spring 12. The impulse wheel also carries the rotary impulse tooth 13 which operates the rotary impulse spring 14. The said impulse wheel is, of course, rigidly secured to a dial shaft. The switch-hook has radiating from its body a number of cam arms 15, 16 and 17 and is pivotally secured to the frame (not shown) of the calling device. The cam arm 15 controls the so-called locking cam 18 which in turn controls the coöperating ground springs 19 and 20. When these ground springs engage, ground is thereby provided to the ground post 21 from the substation ground G′. When the switch-hook is down the cam arm 16 maintains the springs 22 and 23 in contact, thereby bridging the ringer 8 in series with the condenser 9 across the line. The springs 24 and 25 are then disengaged, and the primary circuit is interrupted. The signaling device, whereby a subscriber may signal another after connection has been established, comprises a push-button spring 26 which normally engages the contact point 27; but when the button is pressed the said spring leaves the contact point 27 and engages the contact point 28 which is connected to the substation ground G¹. Means whereby a subscriber may release the central station switching apparatus brought into service comprises the three springs 29, 30 and 31, known as the release springs, which are so controlled by the cam arm 17 that when the switch-hook descends the three release springs are brought into contact, thereby grounding both of the subscriber's line conductors simultaneously.

The first-selector switches C and C¹ are of the type disclosed in United States Letters Patent No. 815,321, granted March 13, 1906, to Keith, Erickson and Erickson. The mechanical details of the first-selector switch are, in general, well known, involving a switch shaft (not shown) which carries the line wipers 32 and 33 and the private wiper 34. The side switch is controlled by the private magnet 35, and when the side switch is in normal or first position the side switch wipers 36, 37, 38 and 39 occupy the position shown by the dotted lines in Fig. 1. In the second position the wipers engage the middle contact points, and when the side switch passes to third position the wipers 36, 37, 38 and 39 engage the contact points shown by full lines in Fig. 1. While the side switch is in first and second position the calling subscriber controls the switch by means of the vertical and rotary line relays 40 and 41, which latter are connected to the battery lead through the springs of the bridge-cut-off relay 42. While the side switch is in first position the calling subscriber controls the vertical magnet 43, which operates to give the switch shaft a vertical motion. By means of the rotary line relay 41, and while the side switch is in first or second position, the subscriber controls the private magnet 35 and, therefore, the side switch. When the side switch is in second position the rotary magnet 44 is energized, and the switch shaft that carries the wipers 32, 33 and 34 is operated in a rotary direction. The vertical and rotary line relays, acting conjointly, provide the means by which the release magnet 45 is operated by the subscriber while the side switch is in first or second position. If the side switch passes to third position, however, since the selector C is of the trunk-release type the release magnet 45 is then controlled through the connector A by way of the private wiper 34 and by means of the back-release relay 46.

The mechanical details of the selector and connector switches, as is well-known, are very much the same. The present connector switch is of the general type of connector switch disclosed in United States Letters Patent Nos. 815,176, granted March 13, 1906, to Keith, Erickson and Erickson, and 830,653 and 830,654, granted September 11, 1906, to A. H. Dyson, with the addition of the wiper-selecting mechanism shown in Figs. 6 and 7. Furthermore, the connector bank is designed to accommodate one-thousand lines, and the connecting and operating mechanism is arranged to so operate the shaft wipers that any one of the thousand lines may be selected, as will be explained. The connector switch shaft, like the shaft of the selector, carries the line and private wipers, which I have arranged in two sets 47, 48 and 49, and 50, 51 and 52 (Fig. 1). The shaft also carries the master wiper 80. The vertical line relay 53 directly controls the vertical magnet 54, the shaft rotary magnet 55 and also the wiper-selector rotary magnet 56. The rotary line relay 57 controls the private magnet 58 and the switching relay 59a. The private magnet 58, under certain conditions, controls in turn the vertical and rotary magnets 54 and 55, the release magnet 59, and also the side switch wipers 60, 61, 62 and 63. The side switch, of course, has a normal or first position, a second position and a third position. The release magnet 59 is also controlled by the vertical and rotary line relays 53 and 57 conjointly. By the use of the condensers 64 and 65 the circuit through the connector is divided into two sections. The connector is provided with a differentially-wound relay 66 which is composed of the two windings 67 and 68. The function of this relay is to provide the calling subscriber with battery current for talking purposes when the back-bridge relay 69 energizes, and also in conjunction with the vertical line relay 53, to control the ringer relay 70 by means of which the ringer generator E is bridged across the terminals of the called line to signal the called subscriber. The back-bridge relay 69, comprising the windings 71 and 72, provides the called subscriber with talking battery current when the primary circuit of the called substation is bridged across the line. The shaft wiper selecting mechanism of the connector shown in Figs. 6 and 7 comprises a rotary magnet 56 and armature 73 adapted to engage the ratchet wheel 74, whereby the wipers (Fig. 8) may be moved over the contacts of the bank (Fig. 7). The switching relay 59a is mounted upon a frame of the switch, and when said magnet is in an energized position the pawl 75 falls over the end of the spring 76, locking the relay in an energized position. Figs. 3, 4 and 5 show details of the shaft and ratchet operating mechanism. It will be seen that the teeth 78a engaged by the vertical armature pawl are the same as usual, while the usual rotary teeth are replaced by the ratchet wheel 77 which is loosely mounted upon the shaft 78, so that the shaft may be raised and lowered without moving the wheel 77. However, when the rotary magnet operates, the rotary armature pawl 79a engages the ratchet wheel and rotates the shaft through the medium of the member 79. It will be seen that the spring which occupies the shaft slot and engages the teeth 78a when the shaft is rotated is flexible. In Figs. 10, 11 and 12 is shown the connector bank arrangement. In Fig. 12 the level M, which may be called the master level, is set off into five groups of ten contacts each, making fifty in the level. Just above the level M (Figs. 11 and 12) is a row of groups of odd-hundreds line banks L, each group comprising ten levels of ten contacts, making five groups of one hundred line contacts in each. Immediately above the line banks L are the private banks P corresponding to the line banks L. Above the banks P are even-hundreds banks L¹ and P¹ (duplicates of the banks L and P) with accommodations for another five hundred lines, making a total of one thousand line contacts in the whole bank (Fig. 12). The wipers 47 and 48 are adapted to make contacts with the banks L, and the wiper 49 with the banks P. Mounted upon the shaft 78 immediately above this set of wipers is a second set 50, 51 and 52 (Fig. 1) adapted to engage the contacts of the banks L¹ and P¹. The wiper 80, which is adapted to engage the contacts of the master level M, is rigidly secured to the shaft 78, as are the line and private wipers, so that when the shaft is raised or lowered the wiper 80 is carried along. The function of the master level M and the operation of the wiper selector switch (Figs. 1 and 7) are as follows: The master level M in a way controls the rotary magnet 55 (Fig. 1), causing it to automatically rotate the shaft wipers over grounded contacts. In Fig. 1 it will be seen that the interrupter springs of the rotary magnet 55 lead to the wiper 80 of the level M. In the level M some of the contacts are grounded at G⁷ and some at G⁸. The ground G⁷ provides ground for the first contact of each group, namely contacts 84, 85, 86, etc., but, as shown in Fig. 1, this ground is, however, controlled by the wiper selector switch. The other contacts are permanently grounded at G⁸. Among the functions of the wiper and hundred or group-selecting mechanism of the connector are the following: First, and as already indicated, to pick out for the use of the connector either one of the sets of main shaft wipers allotted to the connector, the set being determined by the location of the line desired. If the line is in the series of banks L (Fig. 12), the wipers 47, 48 and 49 will be selected, and if the line is in the series banks L¹, the wipers 50, 51 and 52 will be selected. It becomes evident that the arrangement of the banks in Fig. 12 is to obviate the necessity of providing means for rotating the shaft 78 through too great an arc, or of making the bank contacts too small, on the one hand, and on the other hand to limit the vertical movement of the shaft to ten steps. The next function of this connector auxiliary mechanism is to rotate the shaft and its wipers adjacent to the proper hundred-group of the bank contacts in the series of banks L and L¹ (Fig. 12) before the impulses corresponding to the last two digits are sent in for carrying the wipers into actual contact with the line desired. It is, therefore, apparent that these functions of the connector auxiliary mechanism are performed by the first set of impulses that are transmitted to the connector switch after connection has been established with said connector. This connector, unlike the ordinary connector, requires three dial operations to accomplish its full function. The first set of impulses that are directed to the connector (in this case corresponding to the impulses of the second or hundreds digit) affect the connector switch and its auxiliary as follows: The impulses to the vertical line operate the vertical line relay 53, which in turn operates the rotary magnet 56 of the auxiliary mechanism. Normally the wipers 88, 89 and 90, or the main wiper-selecting wipers, are out of engagement with the bank contacts to which the various sets of main switch wipers are multipled; and normally the insulation on the terminal of the wiper 81 maintains the first bank contact 84 of the main level M insulated from ground $G^7$. One vertical impulse operates to carry the wipers 88, 89 and 90 into engagement with the main shaft wipers 47, 48 and 49, but it is insufficient to rotate the insulating end of the wiper 81 away from the contact 82 to which the first bank contact 84 is connected, nor into engagement with the contact 83. A second impulse over the vertical line will carry the wipers 88, 89 and 90 into engagement with the main shaft wipers 50, 51 and 52 of the even-hundreds, and will carry the insulation on the wiper 81 forward so as to insulate the contact 83 from ground $G^7$, but still not enough to permit the contact 82 to fall into connection with the ground $G^7$. The next impulse to the vertical line will move the wipers 88, 89 and 90 into engagement with the odd numbers main shaft wipers 47, 48 and 49, and then for the first time the insulation on the wiper 81 clears the contact 82, whereby the first contact 84 of the section $a$ on the master level M is grounded, with the result that the rotary magnet of the connector is energized; and since all of the remaining contacts of the section $a$ are always grounded, the connector will rotate until its wipers are carried to a position corresponding to the contact 85 of the next section, and so on. Upon referring to Fig. 1 it will be seen that the odd bank terminals of the wiper selector bank are multipled, likewise the even. Hence, when the ratchet wheel is operated one, three, five, seven or nine steps, the wipers 88, 89 and 90 are connected with the shaft wipers 47, 48 and 49, respectively, as shown in Fig. 1; and when operated two, four, six, eight or ten steps, the said wipers are connected with the shaft wipers 50, 51 and 52, respectively.

Figure 2:
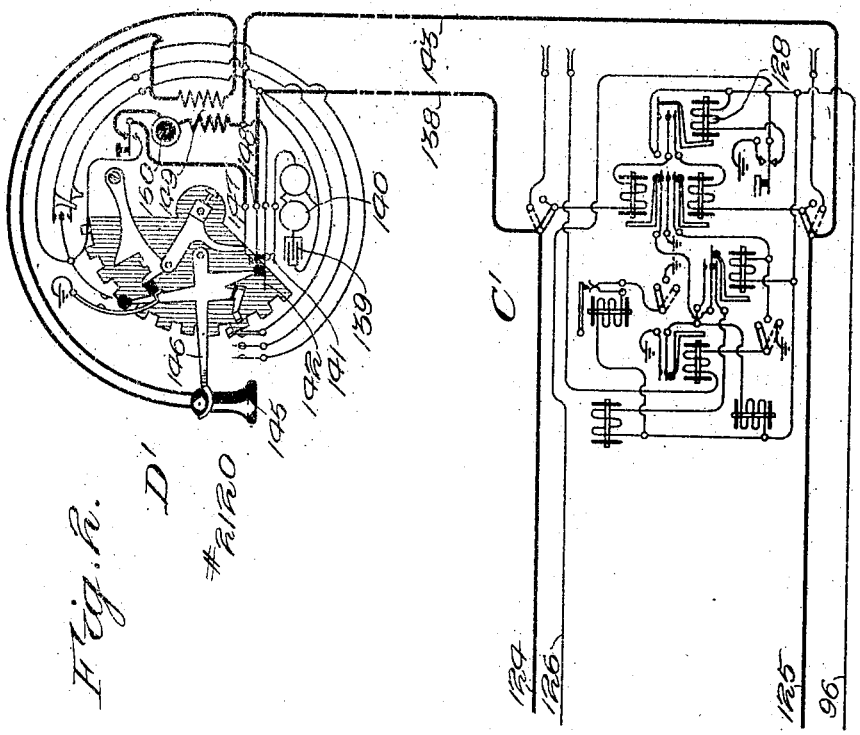
Fig. 2 shows diagrammatically a first-selector switch C¹ allotted to the subscriber's station D¹.

A clearer understanding of the object of this arrangement in my improved connector switch may be had from an explanation of its operation when one subscriber calls another. Suppose, for example, that the subscriber at substation D (Fig. 1) desires to signal the subscriber at substation $D^1$ (Fig. 2), the number of which is 2120. The dial at the calling substation is operated in the well-known manner for each digit. When the dial is turned for the first digit the first-selector switch C is operated to select the connector switch A, and the grounding of the line conductors for the three remaining digits is effective in operating the connector switch. The ground impulses for the second digit operate the wiper selector device to pick out the proper main shaft wipers 47, 48, 49 or 50, 51, 52, and also rotate the said main shaft wipers adjacent to the certain hundred-group determined by the second digit. For the last two digits the connector switch operates in the usual manner to select a certain line from said hundred-group. The calling subscriber suitably operates the dial for the first digit 2. On the return motion of the dial the vertical impulse spring 12 and the rotary impulse spring 14 come into contact with the ground post 21 in the order named, grounding the vertical and rotary line conductors 91 and 92, respectively, the former twice and the latter once. After the first digit is called the first-selector shaft wipers 32, 33 and 34 are raised to the second level of the line and private banks as follows: When the spring 12 engages the ground post 21 an energizing circuit is established through the vertical relay 40 of the first-selector C. The current in this circuit flows from ground $G'$ through the springs 19 and 20 to the ground post 21, thence to the vertical impulse spring 12, vertical line conductor 91, side switch wiper 36, contact point 93, vertical line relay 40, through the bridge-cut-off springs 94 and 95 to the battery lead 96, thence through battery B to ground G. Each time that the vertical line relay 40 is energized the springs 97 and 98 are pressed into engagement, and an energizing circuit is each time established through the vertical magnet 43. The circuit through the said magnet extends from ground $G^2$ to the springs 98 and 97, private magnet springs $98^a$ and 99, vertical magnet 43 to the battery lead 96, thence through battery B to ground G. The vertical magnet being operated twice, the first-selector switch shaft wipers 32, 33 and 34 are carried opposite the first contact of the second bank level that comprises the contact points which constitute the terminals of the trunk-lines leading to the connector A. Following the vertical impulses the rotary impulse spring 14 comes into contact with the ground post 21, thereby grounding the rotary line conductor 92 once and energizing the rotary line relay 41 of the first-selector once. The path of the energizing circuit may be traced as follows: From the substation ground $G'$ through the springs 19 and 20 to the ground post 21, rotary impulse spring 14, rotary line conductor 92, side switch wiper 37, contact point 100, rotary line relay 41, bridge-cut-off springs 101, 94 and 95 to the battery lead 96, thence through battery B to ground G. The rotary line relay 41, upon energizing, closes the springs 102 and 98 in contact, thereby closing an energizing circuit through the private magnet 35 which extends from ground G² through the springs 98 and 102, private magnet 35 to the battery lead 96, thence through battery B to ground G. The private magnet 35 being energized for a moment, the side switch of the first-selector C passes from first to second position, thereby permitting the side switch wiper 39 to engage the contact point 103, thus closing a circuit through the rotary magnet 44. The current-flow is from ground G³ to the contact point 103, side switch wiper 39, through the interrupter springs 104, thence through the rotary magnet to the battery lead 96, and through battery B to ground G. The rotary magnet is energized once, and the shaft wipers 32, 33 and 34 are carried into engagement with the bank contacts that constitute the terminals leading to the connector switch A, assuming that the trunk leading to the said connector leads off from the first set of contacts of the second level. But if the first trunk-line is busy, the first private bank contact is grounded in the well-known manner, and an energizing circuit is established through the private magnet 35 when the private wiper 34 strikes the grounded private bank contact, thereby retaining the side switch in second position and thus maintaining the energizing circuit through the rotary magnet 44. The rotary magnet, by continuing to rotate the wipers, breaks the energizing circuit of the private magnet as soon as an idle line is found, and as soon as the private magnet is deënergized the side switch is tripped into third position; but if there are no contacts to be passed over, as assumed in the first instance, the rotary magnet 44, as is well known, trips the side switch to third position, with the result that the side switch wipers 36, 37, 38 and 39 engage the contact points 105, 106, 107 and 108ª, respectively, thus extending the subscriber's line conductors 91 and 92 to the connector A. Also, since the side switch wiper 38 engages the grounded contact point 107, a guarding potential is established at the private wiper 34 for protecting the seized trunk-line from being molested by any other switch. The second digit is called after the subscriber has established connection with the connector A by way of the trunk conductors 108 and 109. The subscriber also rotates the dial for the second digit 1, thereby grounding the vertical and rotary line conductors 91 and 92, which causes the energization of the connector vertical and rotary line relays 53 and 57. The current for energizing the vertical relay 53 flows over the following path: from ground G' through the vertical impulse spring 12, vertical line conductor 91, side switch wiper 36, first-selector shaft wiper 32, conductor 108 to the vertical line relay 53, through the winding 67 of the differential relay 66 to the battery lead 96, and through battery B to ground G. Of course, the relay 66 becomes energized, since the winding 67 is in series with the vertical line relay 55, but the energization of the said differential relay at this time is without effect. Each time that the vertical relay 53 is energized the line relay springs 110 and 111 are pressed into contact, thereby closing an energizing circuit through the rotary magnet 56 of the wiper selector. This circuit extends from ground G⁴ through the springs 111 and 110, conductor 112, springs 113 and 114, through the rotary magnet 56 to the battery lead 96, thence through battery B to ground G. The vertical line relay being energized once for the second digit, the rotary magnet 56 is energized once and operated to attract its armature 73, whereby the ratchet wheel 74 and the wipers 81, 88, 89 and 90 are moved one step. Normally these wipers rest in the position shown in Fig. 7, but after operating one step the fiber wiper 81 still separates the contact 82 from ground connection, and the wipers 88, 89 and 90 engage the first bank contact which is connected with the shaft wipers 47, 48 and 49, which latter are adapted to engage the banks L and P (Fig. 12). The wiper 80 rests on the contact 84, and the wipers 47 and 48 are opposite the first hundred-group of the bank L, and the wiper 49 is opposite the private bank P; also, the wipers 50, 51 and 52 occupy the same relative position with reference to the banks L¹ and P¹. When the rotary impulse spring 14 is grounded at the substation, the rotary line relay 57 is energized by current flowing from ground G' through the ground springs 19 and 20, ground post 21, impulse spring 14, rotary line conductor 92, side switch wiper 37, contact point 106, shaft wiper 33, conductor 109, rotary line relay 57, winding 68 of the differential relay 66, back-bridge relay springs 115 and 116 to the battery lead 96, thence from battery B to ground G. The rotary line relay, upon energizing, operates to place the springs 117 and 111 in contact, thereby closing an energizing circuit through the switching relay 59ª. This circuit extends from ground G⁴ through the springs 111 and 117, switching relay springs 76 and 118, switching relay 59ª to the battery lead 96, thence through battery B to ground G. This relay, upon energizing, operates to shift the springs 76 and 113 from engagement with springs 118 and 114 into engagement with the springs 119 and 120. When the relay 59ª thus energizes, the locking pawl 75 engages the spring 76 and retains the springs in an operated position, as shown in Fig. 1, until the switch is released. After the relay 59ª operates, the vertical and rotary line relays 53 and 57 are in control of the vertical, rotary and private magnets, and the operation of the connector switch for the last two digits is as usual. The third digit is called after the connector switch has been operated as explained. When the dial is turned for the digit 2 the vertical and rotary line conductors 91 and 92 are again grounded, and the vertical and rotary line relays 53 and 57 are operated as before. This time, however, when the relay 53 operates an energizing circuit is closed through the vertical magnet 54 over the following path: from ground G⁴ to the springs 111 and 110, conductor 112, springs 113 and 120, private magnet springs 121 and 122, side switch wiper 63, contact point 123, vertical magnet 54 to the battery lead 96, thence through battery B to ground G. The vertical magnet, thus energized, operates to raise the shaft and shaft wipers one step at a time until the said wipers are carried two steps to the bank level in which are located the terminals of the line #2120. When the shaft is raised it is, of course, understood that the wiper 80 leaves the master level contact 84, being rigidly secured to the shaft, and does not again engage it until the shaft is released. When the rotary line conductor 42 is grounded the rotary line relay 57 becomes energized and operates to close the springs 117 and 111 in contact. The energization of the rotary line relay 57 causes the energization of the private magnet 58 over a circuit extending from ground G⁴ through the springs 117 and 111, through the springs 76 and 119 to the private magnet 58, springs 115 and 116 to the battery lead 96, thence through battery B to ground G, and the release of the side switch from first to second position, thus placing the wipers 60, 61, 62 and 63 in connection with their respective contact points in second position. The last digit being naught, the subscriber operates the dial as previously described, grounding the vertical line conductor 91 ten times and the rotary line conductor 92 once. The vertical and rotary line relays 53 and 57 are operated over previously traced circuits. However, when the line relay springs 111 and 110 engage, a circuit is closed through the rotary magnet 55 instead of through the vertical magnet 54. The energizing circuit extends from ground G⁴ through the springs 111 and 110, springs 113 and 120, private magnet springs 121 and 122, side switch wiper 63, rotary magnet 55 to the battery lead 96, thence through battery B to ground G. Each time that the rotary magnet is energized it operates to rotate the shaft and shaft wipers 47, 48 and 49 one step at a time until the said wipers are carried into engagement with the normal conductors 124, 125 and 126, the first two of which lead to the line terminals of the desired subscriber's station. The energization of the rotary line relay 57, as previously stated, completes an energizing circuit through the private magnet 58, which now operates with one of two results—either the release of the side switch from second to third position, or the so-called busy-release of the connector, which is brought about in the well-known manner. Suppose the former result to occur and the side switch to pass to third position, thus placing the side switch wipers 60, 61, 62 and 63 in contact with their respective contact points in third position. When the side switch passes to third position a guarding potential is established for protecting the called line. This potential extends from ground G⁵, contact point 127 to the side switch wiper 62, wiper 90 to the switch shaft wiper 49 which engages the private contact of the called line. The engagement of the side switch wiper 62 with the contact 127 closes an energizing circuit through the bridge-cut-off relay 128 of the first-selector C¹ (Fig. 2), thereby removing the bridge formed by the vertical and rotary line relays of the said selector C¹. To signal the called subscriber the calling subscriber presses the signaling button, placing the spring 26 in contact with the substation ground, thereby energizing the vertical line relay 53. The path of the energizing circuit extends from ground G' through the springs 19 and 20, contact point 28, spring 26, springs 25 and 24 to the vertical line conductor 91, through the relay 53, winding 67 of the differential relay 66 to the battery lead 96, thence through battery B to ground G. It will be remembered that the connector side switch has passed from second to third position, and that the side switch wiper 63 is in engagement with the contact point 129, thereby placing the vertical line relay 53 in control of the ringer relay 70 in the same manner in which the rotary magnet 55 came under the control of the vertical line relay when the side switch passed from first to second position. Therefore, when the vertical line relay 53 presses the springs 111 and 110 into contact, the ringer relay 70 is energized by a flow of current from ground G⁴ through the springs 111 and 110, springs 113 and 120, private magnet springs 121 and 122, side switch wiper 63, contact point 129, ringer relay 70, springs 130 and 131 (bearing in mind that the differential relay 66 is energized) to the battery lead 96, thence through battery B to ground G. The ringer relay, upon energizing, shifts the spring 132 from the spring 133 to the spring 134, and the spring 135 is shifted to engage with the spring 136. This results in bridging the terminals of the ringer generator E across the called subscriber's line. A signaling current is, therefore, sent from the generator E to the ringer relay springs 135 and 136, side switch wiper 60, contact point 137, wiper 88 to the shaft wiper 47, normal conductor 124, vertical line conductor 138 (Fig. 2), condenser 139, ringer 140, springs 141 and 142 to the rotary line conductor 143, rotary normal conductor 125, shaft wiper 48, wiper 89, contact point 144, side switch wiper 61, ringer relay springs 132 and 134 back to the generator E. As soon as the calling subscriber ceases to press the signaling button the ringer relay 70 becomes deenergized, and the springs 132 and 133 resume their normal position. The subscriber at substation #2120, in response to the signal, removes the receiver 145 from the switch-hook 146, which allows the springs 147 and 148 to engage and the springs 141 and 142 to disengage, thereby removing the ringer 140 from across his line. The engagement of the springs 147 and 148 closes a series energizing circuit through both windings of the relay 69 at the connector A, said circuit extending from ground $G^5$ to the contact point 127, side switch wiper 62, winding 72 of the relay 69, through the ringer springs 132 and 133, side switch wiper 61, contact point 144, wiper 89, shaft wiper 48, rotary line conductor 125, line conductor 143, through the primary winding 149, transmitter 150, through the springs 147 and 148, vertical line conductor 138, normal conductor 124, shaft wiper 47, wiper 88, contact point 137, through the winding 71 of the relay 69, springs 151 and 131 to the battery lead 96, thence through battery B to ground G. The relay 69, upon energization, operates to shift the spring 115 from the spring 116 (which latter is connected to the battery lead 96) to the spring 152, which is in turn connected with ground. This reversal of the polarity of the spring 115 sets up an energizing circuit which supplies the calling subscriber with talking battery current. The circuit may be traced from ground $G^5$ to the contact point 127, side switch wiper 62, through the springs 152 and 115, winding 68 of the differential relay 66, rotary line relay 57, shaft wiper 33, side switch wiper 37, rotary line conductor 92, primary winding 5, transmitter 7, springs 25 and 24 to the vertical line conductor 91, side switch wiper 36, vertical line relay 53, winding 67 of the differential relay 66 to the battery lead 96, thence through battery B to ground G. The two substations are now connected, and communication may be carried on over the circuit shown by heavy lines in Figs. 1 and 2.

The release of the switching apparatus is brought about when the calling subscriber restores the receiver 2 to the switch-hook 3, thereby pressing the release springs 29, 30 and 31 into engagement for a moment. The contact of the said release springs grounds the vertical and rotary line conductors 91 and 92 simultaneously from ground G' to the release spring 31, thence through the springs 30 and 29 to the vertical and rotary line conductors. The grounding of the rotary line conductor 92 produces a short-circuit of the rotary line relay 57 in series with the winding 68 of the differential relay 66 extending from ground $G^5$ to the contact point 127, side switch wiper 62, springs 152 and 115, winding 68 of the differential relay 66, rotary line relay 57 to the rotary line conductor 92, to the release springs 30 and 31 and to ground G'. Therefore, since the winding 67 of the differential relay 66 alone carries current, the said relay now becomes energized and attracts its armature, which latter shifts the spring 131 from contact with the spring 151 into contact with the spring 130. The disengagement of the springs 131 and 151 destroys the energizing circuit through the relay 69, and the spring 115 passes out of engagement with the spring 152 and into contact with the spring 116, which removes the said short-circuit of the rotary line relay 57 and winding 68, and establishes instead an energizing circuit extending from the substation ground G' through the release springs 31 and 30 to the rotary line conductor 92, side switch wiper 37, shaft wiper 33, relay 57, winding 68 of the differential relay 66, through the springs 115 and 116 to the battery lead 96, thence through battery B to ground G. The rotary relay 57 now operates, and the springs 153 and 154 come into contact, whereby an energizing circuit is established through the release relay 46 of the first-selector C in series with the release magnet 59 of the connector A. However, the current now in passing, as above stated, through the winding 68 aids the winding 67 in maintaining the springs 131 and 130 in contact. The energizing circuit through the release relay 46 and release magnet 59 extends from ground $G^6$ to the contact point 107, side switch wiper 38, release relay 46, shaft wiper 34, springs 154 and 153, release magnet 59, springs 130 and 131 to the battery lead 96, and through battery B to ground G. When the connector release magnet 59 is thus supplied with current it energizes, and as a result the switch shaft and side switch are restored to normal position, thus breaking the connection between the connector switch shaft wipers 47, 48 and 49 and the normal conductors 124, 125 and 126. The back-release relay 46, being in the same circuit with the release magnet, energizes simultaneously with the latter and operates to close a circuit through the selector release magnet 45 by pressing the back-release springs 156 and 155 together. The circuit through the said release magnet 45 extends from ground through the springs 155 and 156 to the release magnet 45, thence to the battery lead 96, and through battery B to ground G. When the ground to the line conductors 91 and 92 is interrupted, all the magnets involved in the release are then deenergized, and all of the switches are fully restored. It will be understood, of course, that when the connector switch A is released and the wipers 47 and 48 disengage from the normal conductors 124 and 125, the backbridge relay 69 of the connector A is restored, and the spring 115 returns into normal engagement with the non-grounded battery spring 116, thus cutting off talking battery current from the calling line, and deenergizing the bridge cut-off relay 128 of the selector C'.

If the called line #2120 is busy at the time that the calling subscriber #5000 attempts to establish connection, the connector A is released by the last impulse to the rotary line conductor 92 as follows: The said impulse energizes the rotary line relay 57 of the connector A, which relay in turn energizes the private magnet 58, pressing the private springs 157 and 158 into contact after the private wiper 49 has been carried onto the grounded private bank contact. It is understood, of course, that whenever a line is busy the connector private bank contacts connected with the private normal 126, shown at the selector C, are all connected to ground. Therefore, since the connector side switch is in second position when the private springs 157 and 158 are brought into contact, an energizing circuit is established through the release magnet 59 from the said grounded private bank contact to the private wiper 49, wiper 90, thence to the side switch wiper 62 (which is in second position) to the private magnet springs 158 and 157 to the release magnet 59, thence to battery B and to ground G. The connector switch shaft and side switch are thus released in the well-known manner, and connection is not established with the called line. The busy signal is, of course, established when the subscriber presses his signaling button after he has completed the calling operations and, of course, after the connector is released, as described, in which case the connector side switch is in first position, as explained. As a result the vertical line conductor 91 is grounded when the signaling button spring 26 is carried onto the ground contact 28, whereby the vertical line relay 53 is energized. Therefore, the line relay springs 110 and 111 are brought into contact, and the vertical magnet 54 is operated to raise the switch shaft, whereby the off-normal springs 159 and 160 are brought into contact and a busy-signaling current sent to the calling substation from the busy coil F through the springs 160 and 159 to the side switch wiper 61, ringer relay springs 133 and 132 to the calling subscriber's rotary line conductor 92, thence through the primary winding 5, transmitter 7 to the vertical line conductor 91, and through the vertical line relay 53 of the connector A and winding 67 of the differential relay 66 to the battery lead 96, and to the busy coil F. When the subscriber hangs up his receiver after receiving the busy-signal, he grounds the line conductors 91 and 92 simultaneously, energizing the line relays 53 and 57 of the connector A, as already explained, and producing the release of the switching apparatus as formerly. Furthermore, when the connector release magnet energizes, the wiper-selecting mechanism is also released. Referring to Fig. 3, it will be seen that when the release armature 161 is attracted by the release magnet 59, the link 162 is drawn forward, and when thus moved (see Figs. 6 and 7) it rocks about the pivot point 163, and the finger 164 imparts an outward movement to the members 165 and 166. The locking link 75 then moves about the pivot point 167, freeing the springs 76 and 113. Also, when the pawl 165 is moved about its pivot point 168 the ratchet wheel 74 returns to normal position, owing to the tension of the coil spring 169. Thus when the calling subscriber restores his receiver to the switch-hook, all of the central station switching apparatus which he brought into use is fully released and returned to normal position.

In the foregoing it was shown how the connector switch was operated to select a particular subscriber's line from the first hundred-group. It will now be pointed out how the connector operates to select any particular hundred-group from the ten groups in the connector bank. Assume, for example, that it is desired to select the line 25 in the N-group (Fig. 12) which, in this case, occupies the position of the six-hundred-group. After the first-selector switch has extended connection to the connector switch A the dial is turned for the digit 6. This energizes the vertical line relay 53 which in turn energizes the rotary magnet 56 of the wiper selector, whereby the wipers 81, 88, 89 and 90 are advanced six steps. In advancing six steps the wiper 81 permits the contacts 82 and 83 to be grounded while the contacts 87 and 87$^a$ are disconnected from ground. In Fig. 1 it will be seen that when ground is provided to the contact 82 an energizing circuit is completed through the rotary magnet 55. This circuit extends from ground G$^7$ through the contact point 82, conductor 170, contact point 84, shaft wiper 80, conductor 171, interrupter springs 172, rotary magnet 55 to the battery lead 96, thence through battery B to ground G. The rotary magnet then operates to automatically rotate the shaft wipers. When the wiper 80 engages a section $a$ all of the contacts being grounded the energizing circuit of the rotary magnet is continued, since a new circuit is established extending from ground $G^8$. When the wiper reaches the contact 85 it finds this contact also grounded, because at the auxiliary switch the spring 83 has been permitted to close circuit with ground $G^7$. Therefore, the rotary magnet still does not stop, but passes the wiper 80 onto the grounded section $b$, and the connector continues to rotate until the wiper reaches the contact 86 which is not grounded, the contact 87 being separated by the insulation on the wiper 81 from ground $G^7$. As soon as the wiper 80 reaches the non-grounded contact 86 the connector shaft is stopped. The shaft wipers now occupy the position shown diagrammatically at 50, 51, 52, 47, 48 and 49 in Fig. 12, and when the dial is turned for the digits 2 and 5 both sets of wipers are raised two steps and then rotated five steps into contact with the terminals of the line #25. The lower set of shaft wipers engage contacts of the banks P and L, while the upper set of shaft wipers engage contacts in the banks $P^1$ and $L^1$; but it will be remembered that when the wiper selector operated, the wipers 88, 89 and 90 were rotated to the sixth contact to which are connected the shaft wipers 50, 51 and 52, thus extending the calling line conductors to the top set of wipers instead of to the lower set. Suppose that the line #25 of the five-hundred-group is desired; in that event the wiper selector is rotated five steps, and the wipers 88, 89 and 90 are connected with the lower set 47, 48 and 49. Both sets of wipers, however, will be connected with line 25 of their respective banks.

From the foregoing it will be seen that my connector switch is adapted to make connection with any one of a thousand lines, as diagrammatically represented in Fig. 12.

Figure 13:
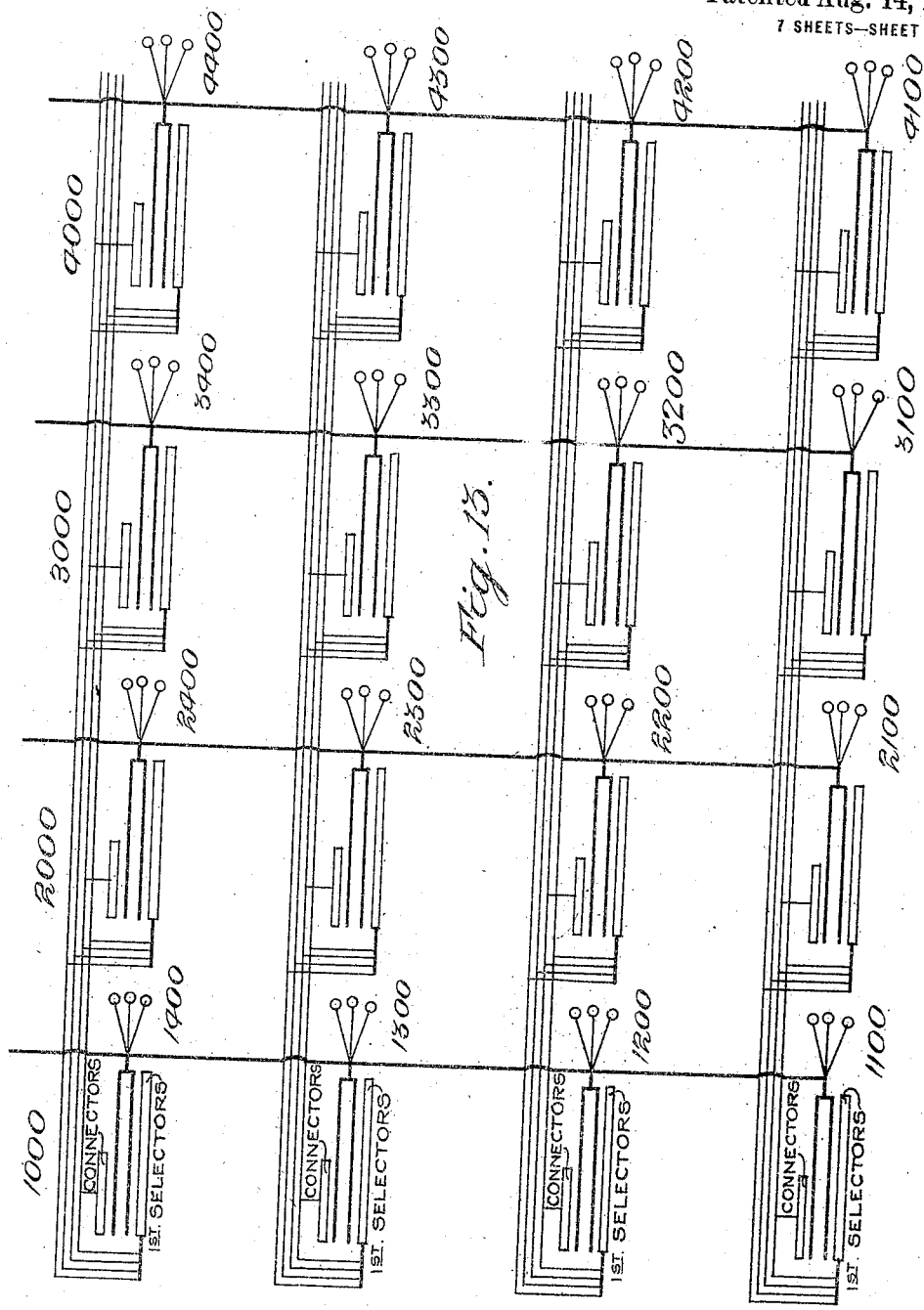
Fig. 13 is a diagrammatic illustration of a section or portion of the trunking arrangement of a ten thousand system embodying the principles of my invention.
Figure 14:
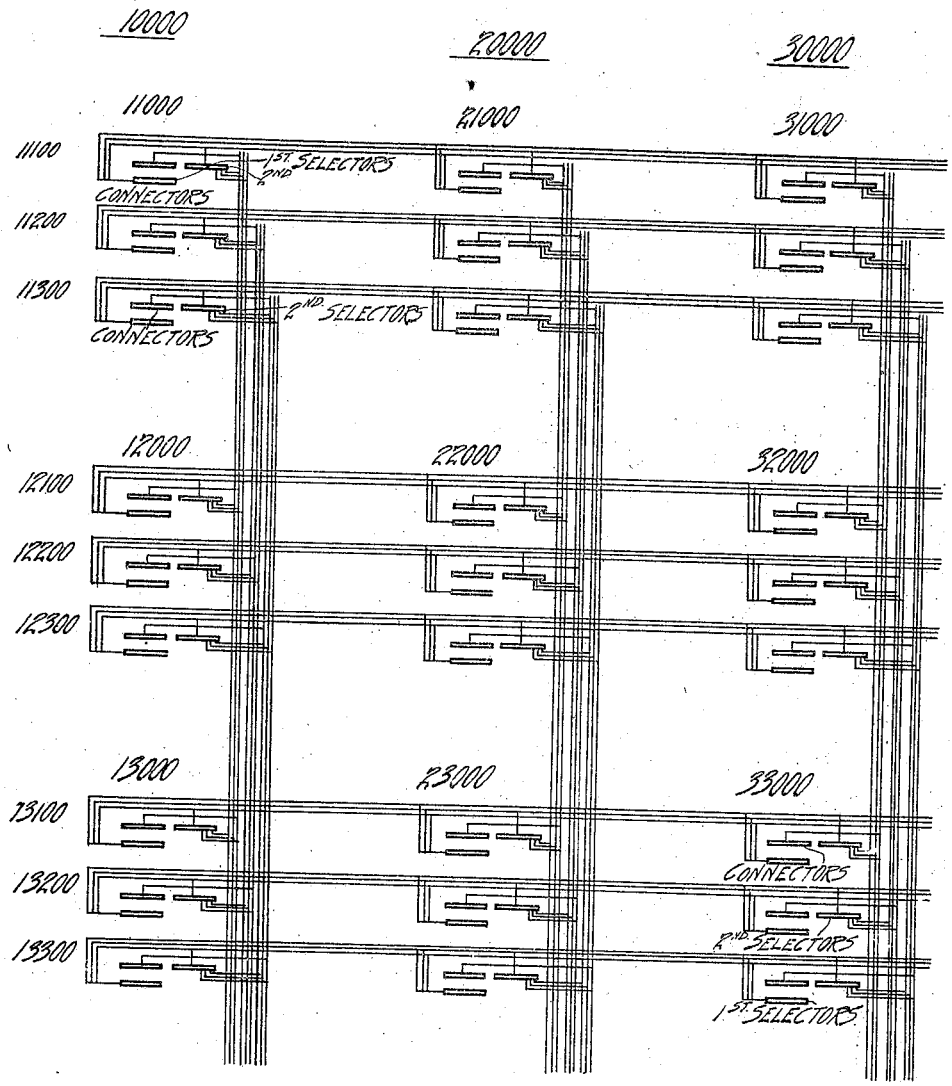
Fig. 14 is a diagrammatic illustration of a portion of the trunking arrangement of a 100,000 system embodying the principles of my invention.

It is obvious that in a system like the one herein described all of the connector switches are not accessible to all of the subscribers. This will become evident upon considering Fig. 13. In this figure four thousand-divisions are shown, each division being marked. At the left is shown the one-thousand-division, and of this thousand division there are shown four one-hundred-groups, namely, the eleven-hundred-group, the twelve-hundred-group, the thirteen-hundred-group and the fourteen-hundred-group. The two-thousand-division is shown to the right of the one-thousand-division, and four of the one-hundred-groups of this thousand are also shown. The same is true of the three-thousand and four-thousand divisions, which are shown in the order named to the right of the two-thousand-division. In each hundred-group, as shown, there is contained a group of first-selectors and a group of connectors. The number of first-selectors is, of course, equal to the number of subscribers, which is, of course, one hundred. The number of connectors may be varied, but is usually ten. If a first-selector in the eleven-hundred-group is operated so that its wipers are raised to the first level, it may then be rotated in this level and thus obtain connection with a connector in the eleven-hundred-board. From the second level the same selector may obtain connection with a connector in the twenty-one-hundred-board. From the third level the first-selector may obtain connection with a connector in the thirty-one-hundred-board, and so on, as indicated. It is obvious that the subscribers of these eleven-hundred, twenty-one-hundred, etc., boards have not access to the connector switches in the various thousands of a different hundred denomination, and it is, of course, obvious that it is not necessary that they should. Since the connectors are of a one thousand capacity, all of the subscribers in the one-thousand-division have contacts in the banks of all of the connectors in their thousand division. With this arrangement all of the subscribers in the same thousand have access to all the connectors in the same thousand. It is also obvious that with this arrangement a two-hundred-subscriber of the first thousand can reach any subscriber in the two-thousand-division, for example, by the use of a connector on the two-hundred-board of the two-thousand-division. He can reach a subscriber in the three-thousand-division through a connector in the two-hundred-board of the three-thousand-division, and so on. In other words, all of the connectors in the like hundreds of the various thousand sections are common to all of the subscribers of the like hundreds of said thousands. This trunking arrangement is, therefore, a departure from the usual method of trunking.

From the foregoing it will be seen that I provide a connector in which terminate one thousand subscribers' lines, notwithstanding the fact that said connector has but two sets of wipers, one for use in conjunction with subscribers' lines having odd hundred numbers, and the other for use in conjunction with subscribers' lines having even numbers. The selection of the wipers always takes place in accordance with the second digit of the called number. The wiper selector will select one wiper and then the other and continue this operation until the proper selection has been made, and thus the subscribers' lines can be numbered from 1 to 9999 in the ordinary manner. Without such arrangement for selecting the wipers it will be seen that the second digit of each subscriber's number would necessarily have to be either one or two, and that this or any other equivalent repetition in numbering the subscribers would interfere with the general scheme of numbering, and would result in a general disarrangement or radical modification of the system of trunking. With my improved arrangement, however, involving means for selecting one wiper and then the other, and then repeating this operation as many times as may be necessary in order to call the second digit of the called number, it will be seen that subscribers are numbered in the usual and ordinary manner, the second digit of each number varying from 1 to 0, resulting in a uniform and consecutive numbering of the different subscribers. If the second digit of the called number is one, then the wiper selector gives the calling subscriber the first set of wipers, which latter operate in conjunction with the group of banks containing the terminals of all lines the numbers of which have odd numbers for their second digits. If, however, the second digit of the called number is 2, then the wiper selector passes from the first set of wipers to the second set of wipers, which latter set operates in conjunction with the group of banks containing the terminals of the subscribers' lines the numbers of which have even numbers for their second digits. Now suppose, as previously explained, that the second digit of the called number is 3, then the wiper selector goes from the first wiper to the second wiper, and then back to the first wiper, and thus the established method of calling is preserved, notwithstanding the fact, as stated, that the connector gives the calling subscriber a choice of only two line wipers. If the second digit of the called number should be 8, then the wiper selector will pass from the first wiper to the second wiper, and this round or cycle of operations will be repeated four times, whereby the wiper selector will finally give the calling subscriber the second wiper, which latter is allotted to the even digit numbers. As explained, this selection of the required wiper is under the direct control of the calling subscriber, being in response to the number of impulses arbitrarily transmitted by the calling subscriber in accordance with the value of the second digit of the called number, and the automatic selection of the required bank of line terminals by the wiper then takes place afterward and immediately before the step-up and step-around operation of the connector in accordance with the last two digits of the called number. Consequently, the entire operation of the connector is divided into four parts, first the selection of the proper wiper in accordance with the second digit of the called number; second, the automatic selection of the bank of line terminals corresponding to the second digit of the called number; third, the stepping up of the wiper to the required level in the selected bank in accordance with the third digit of the called number; and, fourth, the rotation of such wiper in such level to a point where it engages the terminal of the called line. If the called line belongs to the same hundred as that of the calling line, then the connector employed will be on the board of the called subscriber, regardless of whether the calling or called subscribers are of the same or different thousand divisions. For example, if the subscriber of the one-hundred-board in the one-thousand-division calls another subscriber of the same hundred and thousand, the connector employed will be on the board of both subscribers; but if the called subscriber's line terminates at the one-hundred-board of the two-thousand-division, then the connector employed will be on this board and not on the board of the calling subscriber; and, similarly, should a subscriber of the one-hundred-group of the one-thousand-division call a subscriber in the one-hundred-group of the three-thousand-division, then the connector employed will be on the board of the said called subscriber. Suppose, however, that a subscriber of the one-hundred-group of the one-thousand-division calls a subscriber whose line terminates in the two-hundred-board of the two-thousand-division. In such case the calling subscriber gets a connector on the one-hundred-board of the two-thousand-division, inasmuch as all of the subscribers' lines of this division are multipled in the different groups and are thereby represented in any connector of the said division; consequently, for this purpose it is unnecessary that the calling subscriber should use a connector on the board of the called subscriber. A calling subscriber, in other words, always gets a connector on a board of the hundred to which the calling subscriber belongs—that is to say, if the calling subscriber is a one-hundred subscriber, then whenever he calls the connector which he uses will invariably be upon one of the one-hundred-boards, depending upon into which thousand-division he calls. The connector is always on the board of the called subscriber if the called subscriber and the calling subscriber belong to the same hundred; but if not, then the connector which the calling subscriber gets is in the same thousand-division to which the called subscriber belongs, but on a board of the same hundred to which the calling subscriber belongs. This, it will be seen, is due to the fact that the subscribers' lines of any particular division are each provided with multiple terminals in each of the hundred groups of that division—that is to say, each subscriber's line in the one-thousand-division has one hundred multiple terminals, ten in each one-hundred-group of that division; and in this way it makes no difference which hundred-board in that division is called, as any connector thereon has a terminal of the called line. Furthermore, and owing to the fact that each connector contains the terminals of one thousand lines, it is not necessary that any one subscriber have access to more than one hundred connectors, which connectors are divided into ten sets, each set bearing terminals of and representing the lines of a different thousand subscribers. For example, if a one-thousand-one-hundred-subscriber calls a subscriber of his own thousand and hundred, he automatically obtains connection with the first idle one of ten connectors on his own board, any one of which connectors will serve his purpose, because they all contain multiples of the entire one/thousand lines of that division. Suppose, however, that he calls a subscriber in the two-thousand-one-hundred-group; then, in that case, he is given the first idle one of ten connectors on the board of the called subscriber, any one of which connectors contains multiples of all of the lines in this particular thousand division; and this would also be true should he call a subscriber in the one-thousand-two-hundred-group, except that in such case the connector would not be on the board of the called subscriber, but on the same board as before. In other words, the one-thousand-division of the exchange contains one hundred connectors, divided into ten sets, each set for use in calling from a different hundred; and, consequently, a subscriber of any particular thousand and hundred has access to only one hundred connectors in the entire exchange, which, however, for the reasons given, is sufficient to insure good service to all of the subscribers, the maximum number of calls at the same time having been demonstrated by experience to be in the long run not over ten per cent. of the entire number of subscribers.

My invention also contemplates the provision of second-selectors between the first-selectors and the connectors, and in such case the second-selectors will be arranged on the same basis as the connectors—that is to say, there will be certain selectors that are accessible to some subscribers but not accessible to others, and the total number of second-selectors will be the same as the total number of connectors, which would be ten thousand for a one hundred thousand subscriber system. As in the ten-thousand system, the switches of the one-hundred-thousand system are arranged in one-hundred thousand-division, each consisting of ten minor divisions or boards as follows: One 100-board, one 200-board, etc., and one 000 (naught hundred) board. In this one-hundred-thousand system the thousand-divisions are one 11000, one 12000, etc., one 21000, one 22000, etc., up to 91000, etc., and one 01000 (naught one thousand), etc., divisions, each consisting of ten one-hundred-boards, as above described. In this one-hundred-thousand system, furthermore, the banks of the first selectors of the 100-boards in the 11000, 21000 up to 91000 and 01000 groups are multipled just as in the ten-thousand system the 100-boards in the 1000, 2000, etc., groups are multipled. Similarly the banks of the first selectors of the 200-boards are multipled in the above-named 11000, etc., groups, and so on for the first selectors of the 300, 400, etc., boards. Likewise, the first selector banks of the 12000 up to 02000 groups are multipled in this same manner, and so on throughout the entire system. The trunk lines leading from the ten levels of the first selector banks are connected to the second selectors on the ten-boards whose first selector banks are multipled. For instance, trunks from the first level of the 100-boards of the 11000, 21000 groups, etc., are connected to the second selectors of the 100 board of the 11000-group (the first thousand in the 10000 or first grand division). The trunks from the second level of these same first selectors are connected to the second selectors on the 100-board of the 21000-group. The trunks from the first level of the first selector banks of the 200-boards of these same thousand-groups are connected to the second selectors on the 200-board of the 11000-group, etc. The banks of the second selectors of the 100-boards of the 11000, 12000, 13000 groups, etc., (the groups of the 10000 first grand division) form a group of banks that are multipled in the same way that the banks of the first selectors of the 100-boards of the successive thousands in a ten-thousand system are multipled. The second selectors of the 100-boards of the 21000, 22000, 23000 groups, etc., are multipled in the same manner. The banks of each group of these second selectors that are multipled as above are connected to the connectors on the same boards. For instance, the first level of the banks of the second selectors on the 100-boards of the 11000, 12000 groups, etc., (the 10000 or first grand division) are connected to the connectors on the 100-board of the 11000-group. The second level of the same selector banks is connected to the connectors on the 100-board of the 12000-group. In a similar manner the banks of all the connectors belonging to a particular thousand-group are multipled and connected to the subscribers' lines of that thousand. For example, the banks of the connectors of all the boards of the 11000-group are multipled and connected to one thousand corresponding lines. The banks of all the connectors of the 12000-group are likewise multipled, and so on throughout the entire system. This system will be readily understood by those skilled in the art and who are familiar with the system disclosed in United States Letters Patent No. 813,876, granted September 5, 1906, to A. E. Keith, which system is very similar to the one described herein, with the exception that in said patent the connectors have a capacity of only one hundred lines, thus limiting the capacity of the system to ten-thousand lines.

My invention also contemplates the provision of line switches of the type described in the *Western Electrician* of Chicago, Illinois, of January 11, 18 and 25, 1908, for preliminary trunking between the subscribers' lines and the first-selectors, and with such arrangement the first-selectors could be equal in number to the connectors, and to the second-selectors if the latter are used. As the introduction of line switches into the system in order to decrease the number of first-selectors, as well as the introduction of second-selectors into the system in order to increase the capacity thereof, will be readily understood, no illustration of such arrangement is necessary.

What I claim as my invention is:—

1. In a telephone system, a plurality of subscribers' lines divided into groups, a set of automatic connectors for each group, each connector having a multiple terminal of each line of each group, and means whereby the subscribers of any group have access only to the connectors allotted to such group for calling any subscriber in the different groups.

2. In a telephone system, a plurality of subscribers' lines divided into groups, each group representing a different hundred, a set of automatic connectors for each group, and means for automatically trunking calling subscribers' lines into connection with idle connectors, said trunking means affording the subscribers of any group access only to the connectors allotted to such group.

3. In a telephone system, a plurality of subscribers' lines, automatic connectors less in number than said lines, and automatic trunking means whereby certain subscribers have access to some of said connectors and certain other subscribers have access to other connectors, each subscriber thereby having access to only a portion of the total number of connectors, but each subscriber having access to a sufficient portion of the total number of connectors to permit the calling of any subscriber in the exchange.

4. In a telephone system, a switch comprising a bank of line terminals, a plurality of line wipers therefor, means by which a calling subscriber selects one of said wipers, and means by which the calling subscriber then operates all of said wipers by a vertical and then a rotary motion to cause the selected wiper to engage the terminal of the called line, said wiper in its rotary movement passing over a plurality of contacts.

5. In a telephone system, a bank of line terminals divided and sub-divided, a plurality of line wipers, means by which a calling subscriber selects a wiper and a division of the line terminals, means for at the same time selecting the desired sub-division, and means by which the calling subscriber then operates the selected wiper to seize the called line in the selected sub-division.

6. In a telephone system, line terminals arranged in banks, a shaft mounted for vertical and rotary motion, a plurality of line wipers thereon, means by which a calling subscriber selects one of said wipers, and means by which the calling subscriber then operates said shaft vertically and then in a rotary manner to cause the selected wiper to engage the terminals of the called line, said wiper in its rotary movement passing over a plurality of contacts.

7. In a telephone system, subscribers' line terminals arranged in divisions, each division divided into groups, a line wiper for each division, means for selecting the wiper of the division in which the called line is found, means for selecting the required group in the selected division, and means for then operating the said wipers to cause the selected wiper to engage the terminal of the called line, all subscribers whose numbers are odd in a certain digit thereof having lines terminating in one division, and all subscribers whose numbers are even in the same certain digit thereof having lines terminating in the other division.

8. In a telephone system, subscribers' lines terminating in a bank of line terminals, a line wiper providing a path for talking currents, means for causing said wiper to have rotary motion to approach the bank, means for causing said wiper to then have vertical motion to attain a certain desired level in said bank, and means for then effecting a further rotary motion of the said wiper to obtain connection with a terminal in the selected level.

9. In a telephone system, subscribers' lines terminating in a plurality of banks of line terminals, a line wiper providing a path for talking currents, means for giving said wiper a rotary motion from one bank to the other in approaching the desired bank, means for then causing said wiper to move from one plane to another in the selected bank, and means for then effecting further rotary motion of said wiper to obtain connection with a line in the selected bank.

10. In a telephone system, a shaft mounted for both endwise and rotary motion, a plurality of wipers on said shaft, means for selecting either wiper a plurality of times if a certain digit of the called number has a value of more than two, line terminals arranged in bank form, and means for operating the selected wiper to engage the terminal of the called line.

11. In a telephone system, line terminals arranged in groups, a plurality of line wipers, means by which the electrical impulses for a certain digit of the called number automatically extends connection to one of said wipers, means by which the same set of impulses automatically selects the group of line terminals in which the called line is found, and means for then operating the line wiper to engage the terminal of the called line.

12. In a telephone system, subscribers' lines terminating in a bank of line terminals, a line wiper providing a path for talking currents, and instrumentalities controlled by the calling subscriber for causing said wiper to have rotary and then vertical and then rotary motion in finding the line terminal of the called subscriber.

13. In a telephone system, a plurality of sets of wipers, means for selecting these sets in succession, and for repeating the operation, according to the number called, and means for controlling said wipers.

14. In a telephone system, subscribers' lines, means for interconnecting any two lines, said means including impulse-transmitting mechanism, a wiper serving as a path for talking currents, a wiper-selecting means, a shaft carrying the wiper, means for operating said shaft, said selecting means comprising a relay for shifting the impulses from the wiper-selecting means to the shaft-operating mechanism, which mechanism comprises a vertical magnet, a rotary magnet and a private magnet, substantially as described.

15. A telephone system comprising a switch including a plurality of groups of contact banks, a bank-group-selecting means in said switch comprising a shaft and suitable wipers, means for providing a guarding potential to prevent said selecting means from selecting the bank group thus provided with guarding potential.

16. In a telephone system, groups of contact banks, means for establishing guarding potential for said groups of contact banks, comprising a master bank divided into sections, each section having first contacts, and the remaining contacts in each section being connected together and with guarding potential, means for also connecting or disconnecting said first contacts to or from guarding potential, whereby a bank-group or bank-groups may be protected by guarding potential, and whereby said selecting means will not stop at such section or sections, but will continue to advance or rotate until the first unguarded contact is found.

17. In a switch, a plurality of groups of contacts, a plurality of wipers, a group-selecting means comprising a master switch contact bank, wiper-selecting means adapted to rotate over said wipers and comprising the auxiliary arrangement adapted to establish a guarding potential for a group of contact banks by grounding the first contact of that group each time that the wiper-selecting means has completed one round of the wipers and begun another.

18. In a switch, a plurality of groups of contact banks, bank-group-selecting means comprising wipers for each group, said bank-groups divided into even-number sections and odd-number sections, some of said wipers allotted to the even sections, some to the odd sections, means for selecting the wipers of either section, and means for applying guarding potential for determining which group of banks shall be selected.

19. In a telephone system, wipers, wiper-selecting mechanism, contact banks arranged in groups, group-selecting mechanism, line relays for controlling the group-selecting and the wiper-selecting mechanism, and means for transmitting current to control said mechanism, as set forth.

20. In a telephone system, a switch comprising a bank of line terminals, a plurality of line wipers therefor, means by which a calling subscriber selects one of said wipers, and means by which the calling subscriber then operates all of said wipers by a vertical and then a rotary motion to cause the selected wiper to engage the terminal of the called line, there being more groups of lines than there are wipers.

21. In a telephone system, line terminals arranged in banks, a shaft mounted for vertical and rotary motion, a plurality of line wipers thereon, means by which a calling subscriber selects one of said wipers, and means by which the calling subscriber then operates said shaft vertically and then in a rotary manner to cause the selected wiper to engage the terminals of the called line, there being more groups of lines than there are wipers.

22. In a telephone system, a connector switch, a plurality of lines terminating in terminals at said switch, said lines divided into a plurality of two-digit groups, a set of wipers associated with all of said lines, and means in said switch for moving said wipers adjacent to any one of said groups and for then moving said wipers into engagement with any terminal in the adjacent group in response to a two-digit operation in the number of said terminal, each operation of the wipers to move from any group to an adjacent group requiring a plurality of steps.

23. In a telephone system, a plurality of lines, a connector switch for establishing connection with any one of said lines, said lines terminating in terminals in a bank, said terminals divided into groups, a set of wipers for establishing connection between said connector and any one of said lines, means in said connector for first moving the said wipers adjacent to any one of said groups, and for then moving said wipers into engagement with any terminal in the group in response to an operation corresponding to two digits of the number of the terminal, each operation of the wipers to move from any group to an adjacent group requiring a plurality of steps.

24. In a telephone system, a plurality of lines, a connector switch for establishing connection with any one of said lines, said lines terminating in terminals in a bank, said terminals divided into groups, a set of wipers for establishing connection between said connector and any one of said lines, means in said connector for first moving the said wipers adjacent to any one of said groups, and for then moving said wipers into engagement with any terminal in the group in response to an operation corresponding to two digits of the number of the terminal, another group of lines terminating in said bank, said lines also divided into similar groups, another set of wipers for said connector for establishing connection between the connector and any one of the lines in said second group, said means in said connector also for first moving said second set of wipers adjacent to any one of said second groups and for then moving said wipers into engagement with any terminal in the group in response to an operation corresponding to two digits of the number of the terminal.

25. In a telephone system, a plurality of lines, a connector switch for establishing connection with any one of said lines, said lines terminating in terminals in a bank, said terminals divided into groups, a set of wipers for establishing connection between said connector and any one of said lines, means in said connector for first moving the said wipers adjacent to any one of said groups, and for then moving said wipers into engagement with any terminal in the group in response to an operation corresponding to two digits of the number of the terminal, another group of lines terminating in said bank, said lines also divided into similar groups, another set of wipers for said connector for establishing connection between the connector and any one of the lines in said second group, said means in said connector also for moving said second set of wipers adjacent to any one of said second groups and for then moving said wipers into engagement with any terminal in the group in response to an operation corresponding to two digits of the number of the terminal, a line for said connector and wiper selecting mechanism in said connector for connecting said line with either one of said sets of wipers.

26. In a telephone system, a plurality of lines, a connector switch for establishing connection with any one of said lines, said lines terminating in terminals in a bank, said terminals divided into groups, a set of wipers for establishing connection between said connector and any one of said lines, means in said connector for first moving the said wipers adjacent to any one of said groups, and for then moving said wipers into engagement with any terminal in the group in response to an operation corresponding to two digits of the number of the terminal, another group of lines terminating in said bank, said lines also divided into similar groups, another set of wipers for said connector for establishing connection between the connector and any one of the lines in said second group, said means in said connector also for first moving said second set of wipers adjacent to any one of said second groups and for then moving said wipers into engagement with any terminal in the group in response to an operation corresponding to two digits of the number of the terminal, a line for said connector and a wiper selecting mechanism in said connector for alternately selecting said wipers for connecting said line with whichever one of said wipers is selected last.

27. In a telephone system, a plurality of lines, a connector switch for establishing connection with any one of said lines, said lines terminating in terminals in a bank, said terminals divided into groups, a set of wipers for establishing connection between said connector and any one of said lines, means in said connector for first moving the said wipers adjacent to any one of said groups, and for then moving said wipers into engagement with any terminal in the group in response to an operation corresponding to two digits of the number of the terminal, a guarding potential circuit in each group for making the whole group busy, and means for applying a guarding potential to each one of said circuits, said first means controlled by said guarding potential.

28. In a telephone system, a plurality of lines, a connector switch for establishing connection with any one of said lines, said lines terminating in terminals in a bank, said terminals divided into groups, a set of wipers for establishing connection between said connector and any one of said lines, means in said connector for first moving the said wipers adjacent to any one of said groups, and for then moving said wipers into engagement with any terminal in the group in response to an operation corresponding to two digits of the number of the terminal, a guarding potential circuit in each group for making the whole group busy, and means for applying a guarding potential to each one of said circuits, said first means controlled by said guarding potential, said last means controlled by an operation corresponding to a digit in the number of the terminal.

29. In a telephone system, a connector switch, a set of wipers for said connector switch, a plurality of lines having terminals in said connector switch associated with said wipers, said terminals divided into groups, a guarding potential circuit associated with said groups, and means for applying potential thereto for controlling said connector to prevent the said wipers from establishing a connection with any one of said lines, and means controlled by said circuit for moving said wipers to any one of said groups.

30. In a telephone system, a switch comprising a bank of line terminals, a plurality of wipers for said switch, means by which a calling subscriber selects one of said wipers in accordance with a digit of a called number, and means by which the calling subscriber then operates the selected wiper by a plurality of selective movements each corresponding to a separate digit of the called number to connect with the called line, said last means common to the other wipers for operating said other wipers.

31. In a telephone system, a trunk line terminating in an automatic switch, fixed called line terminals in said switch, a plurality of movable terminals coöperating therewith and having a common operating mechanism, means by which a calling subscriber extends his line into connection with said trunk line, means by which the calling subscriber further extends his line into connection with a particular one of said movable terminals, and means by which the calling subscriber operates the connected movable terminal to complete connection with a called line.

32. In a telephone system, an automatic switch comprising a bank of line terminals divided into groups, a wiper for said switch having a preliminary hunting movement to select a group of terminals, a device controlled by a calling subscriber in accordance with a digit of a called number to limit the extent of the hunting movement of said wiper and arranged to stop before the wiper stops, and means by which the calling subscriber then operates said wiper to connect with the called line.

33. In a telephone system, a switch comprising a bank of called line terminals divided into groups, a wiper for each group, subdivisions of each group, means by which a calling subscriber selects one of said wipers, automatic means coöperating with said first means for advancing the selected wiper to a desired subdivision of terminals, and means by which the calling subscriber then operates the selected wiper to connect with the called line.

34. In a telephone system, an automatic switch, comprising fixed terminals and a movable terminal associated therewith, a plurality of operating magnets for said movable terminal, means for extending a calling line to said switch, and means by which the calling subscriber controls said magnets alternately to produce a plurality of distinct selective movements of said movable terminal exceeding in number the number of said magnets.

35. In a telephone system, subscribers' lines divided into groups on a non-decimal basis, said lines provided with call numbers on a decimal basis, automatic means for connecting a calling and a called line, said means including a switching mechanism for selecting the group in which the called line is located, means for transmitting series of impulses corresponding to the digits in the number of the called line over the calling line to control the establishment of the connection, and an auxiliary translating device responsive to one of said digits to control said mechanism.

36. In a telephone system, subscribers' lines divided into groups on a non-decimal basis, call numbers for said lines on a decimal basis, means for connecting a calling and a called line, said means including an automatic switching mechanism for selecting the group in which the called line is located, an auxiliary translating device responsive to a series of impulses corresponding to a digit in the number of the called line, and means whereby said device controls the selecting operation of said mechanism.

37. In a telephone system, the combination with an automatic switch comprising a bank of line terminals divided into non-decimal groups, and a movable wiper having resting positions corresponding to said groups, of a calling subscriber's line, means for extending said line to said switch, means by which the calling subscriber transmits over said line a series of impulses corresponding to a digit in a called number, a device for registering said impulses, and means controlled by said device for advancing said wiper to the position corresponding to the group in which the called line is located.

38. In a telephone system, subscribers' lines divided and sub-divided into a plurality of groups, certain of said sub-divisions being on a non-decimal basis, automatic switching mechanisms for use in connecting calling and called lines by selecting groups and successive sub-divisions thereof, means for transmitting series of controlling impulses direct to those mechanisms which perform the decimal group selection, and intermediate translating devices for receiving other series of impulses to control those mechanisms which perform the non-decimal group selection.

39. In a telephone system, a plurality of subscribers' lines, means whereby a calling subscriber can transmit over his line a plurality of series of impulses, each series corresponding to a digit of a called number, automatic switching mechanisms at the exchange, and means whereby said mechanisms are directively controlled by the calling subscriber through the medium of said plurality of impulse series to perform a different plurality of distinct selective operations, each of said selective operations also directively controlled, whereby connection is established with the called line.

40. In a telephone system, an automatic switch comprising a bank of line terminals divided into groups, a movable wiper for said switch, a calling line and means for extending the same to said switch, a device for registering a series of impulses received over the extended calling line and corresponding to a digit in the number of the called line, and means whereby said wiper is advanced under control of said device into association with the group of terminals in which the called line is located by a number of steps dependent upon but not equaling the number of impulses in the series.

41. In a telephone system, the combination with a calling telephone line and a trunk line terminating in an automatic step by step switch, of means for connecting said lines, a device for registering a series of impulses received over the calling line, and means whereby said device controls said switch to cause the operation thereof in a number of steps not equaling but bearing a definite relation to the number of received impulses.

42. In a telephone system, the combination with an automatic switching mechanism and a line connected thereto, of means for transmitting a single series of impulses over said line, and means whereby said mechanism is operated in response to said impulses to perform two distinct selective operations each dependent upon the number of impulses in the series.

Signed by me at Chicago, Cook county, Illinois, this 2nd day of July, 1908.

ALEXANDER E. KEITH.

Witnesses:
J. NORBY,
ALBERT J. SAUSER.